United States Patent [19]

Akao

[11] Patent Number: 4,579,781
[45] Date of Patent: * Apr. 1, 1986

[54] MATERIAL FOR PACKAGING LIGHT-SENSITIVE MATERIALS

[75] Inventor: Mutsuo Akao, Minami-ashigara, Japan

[73] Assignee: Fuji Photo Film Co., Ltd., Kanagawa, Japan

[*] Notice: The portion of the term of this patent subsequent to Jun. 5, 2001 has been disclaimed.

[21] Appl. No.: 482,479

[22] Filed: Apr. 6, 1983

[30] Foreign Application Priority Data

Apr. 7, 1982 [JP] Japan .................................. 57-56642

[51] Int. Cl.4 ............................................ B32B 15/08
[52] U.S. Cl. .................... 428/461; 428/500; 428/511; 428/516
[58] Field of Search ............... 428/500, 511, 516, 515, 428/461; 430/496

[56] References Cited

U.S. PATENT DOCUMENTS

| 3,884,692 | 5/1975 | Minagawa | 430/496 |
| 4,337,285 | 6/1982 | Akao et al. | 428/356 |
| 4,337,298 | 6/1982 | Karim et al. | 428/461 |
| 4,452,846 | 6/1984 | Akao | 428/290 |

Primary Examiner—Edith Buffalow
Attorney, Agent, or Firm—Burns, Doane, Swecker & Mathis

[57] ABSTRACT

A light-shielding paper consists of a laminate comprising a substrate, a polyethylene polymer layer comprising 50–100% by weight of L-LDPE and being substantially free from light-shielding material, the laminate as a whole containing light-shielding material, and a protective layer on the side opposite to the polyethylene polymer layer.

30 Claims, 8 Drawing Figures

MATERIAL FOR PACKAGING LIGHT-SENSITIVE MATERIALS

BACKGROUND

The present invention relates to a material for packaging light-sensitive materials, in particular, to a material for packaging light-sensitive materials, having improved flexibility, tear strength and heat-seal properties.

Packaging materials completely intercepting light are used for packaging light-sensitive materials which will cause their quality and value to deteriorate on exposure to light. Such packaging materials must have excellent light-shielding properties; physical strengths such as breaking strength, tear strength, extent of impact perforation, Gelbo test strength etc.; heat seal properties such as heat seal strength and hot seal strength; anti-static properties and the like. It is difficult to provide a single film material which possesses all the above-mentioned properties. Therefore, composite laminated films composed of an LDPE film comprising carbon black or pigments dispersed therein, and flexible sheets such as paper, aluminum foil, cellophane etc. have heretofore been used in the art.

Such laminated films do not have sufficient physical properties and have disadvantages in that they are readily torn or pinholed during packaging work and in that heat sealed portions are readily separable. Furthermore, incorporation of a great quantity of light intercepting material (referred to "light-shielding material" hereinafter) such as carbon black urges to reduce the physical strengths to a great extent. Thus the amount of the light-shielding material should be limited to about 3 weight % and the thickness of film should be not less than 70 μm resulting in that the film becomes so bulky and rigid as to entail a poor processing properties on packaging and a high manufacturing cost.

SUMMARY OF THE DISCLOSURE

Accordingly, it is an object of the present invention to provide a novel packaging material.

It is another object of the present invention to provide a novel packaging material based on linear-low density polyethylene (L-LDPE) free from the above-mentioned disadvantages.

It is a further object of the present invention to provide a packaging material superior in light-shielding properties, moisture proofness, physical strength, anti-static properties, heat seal properties as well as processing properties on packaging.

Still further objects of the present invention will become apparent in the following disclosure.

Generally, materials for packaging light-sensitive materials are composed of different types of flexible sheets, such flexible sheets encompassing, e.g., black-colored papers or films; papers or films including a colored layer(s); and those which are provided with a light-shielding layer on such flexible sheets that have no or insufficient light-shielding properties. On such flexible sheets are often printed characters or symbols necessary for use or for improving its commercial value. Such flexible sheets may be provided with a protective layer on its one surface or on both.

The materials for packaging light-sensitive materials according to the present invention relate to those which are applicable to various types of encompassing materials for packaging photosensitive or photographic materials; or envelopes or bags therefor; so-called light-shielding papers used as a backing sheet for a photographic roll film; or the like.

The light-shielding papers for photographic roll film are used in such manners that they are wound upon a spool superposed on a given length of a photographic film or wound within a hollow drum, e.g., magazine of a given size even when no spool is used. Accordingly, the maximum thickness of the light-shielding paper is limited since the length of such paper is given.

A photographic film for exposure is contained in a magazine referred to as "126 cartridge" by those skilled in the art as disclosed in U.S. Pat. No. 3,138,084. The magazine is provided with an aperture for exposure, in which the photographic film is not completely supported. Therefore, sagging of the photographic film is likely to arise due to a difference between respective feeds of the film and the light-shielding paper within the area of aperture while the superposed sheets of the photographic film and the paper are being fed toward a take-up magazine from a feed magazine. For avoiding such sagging of the film the light-shielding paper should be thick in order to acquire an increased feed of the paper.

Furthermore, the light-shielding paper should be so flexible that the paper may well adhere to the spool and the photographic film to enhance the light-shielding ability when the photographic film is wound superposed on the light-shielding paper.

Heretofore manufacture of light-shielding papers including a paper coated with a light-shielding layer widely prevails in considering requirements, limitations and requisite functions of the light-shielding paper.

A simple conventional manner comprises admixing a suitable amount of pigments having the light-shielding ability with a thermoplastic resin such as polyethylene, and hot melt extruding the resultant mixture to form a coating as is disclosed in British Patent No. 1071032 and French Patent No. 1449852.

However, such a conventional manner employing polyethylene as a material for the light-shielding layer is likely to entail various drawbacks due to lack of the flexibility.

Thus in the prior art a softer material has been required for the light-shielding layer than polyethylene. After the inventor's keen efforts to seek a material having such various properties as aforementioned requisite for the light-shielding papers the present invention has been accomplished.

In accordance with the present invention there is provided a material for packaging light-sensitive materials consisting of a laminate comprising a substrate/a polyethylene polymer layer comprising not less than 50% by weight of linear low density polyethylene (L-LDPE), and substantially no light-shielding material, said laminate comprising light-shielding material to provide sufficient light-shielding properties.

DETAILED DESCRIPTION OF THE PREFERRED EMBODIMENTS

Figure 1:
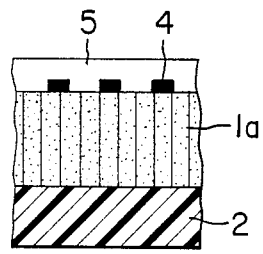
FIGS. 1 to 8 are sectional views showing examples of films for packaging light-sensitive materials according to the present invention.

The term "polyethylene polymer" used herein includes L-LDPE as well as polyethylene manufactured by conventional process, e.g., high pressure process and low/moderate pressure processes.

L-LDPE is a low/moderate density polyethylene copolymer having short branched chains on a linear chain which may be produced by copolymerizing ethylene with α-olefin having 3–13, preferably 4–10 carbon atoms at low pressues. L-LDPE containing 80–99.5 mol % of ethylene is suitable for the present invention.

L-LDPE is generally manufactured by the low pressure process, the density thereof being considered generally low/moderate. Most of L-LDPE applicable in the present invention falls in a range 0.91–0.95 g/cm$^3$, preferably 0.91–0.94 g/cm$^3$. L-LDPE having a melt-index (M. I. at 190° C.) of 0.2 to 25 (preferably 0.4–15) may be used. α-olefin includes 1-butene, 1-octene, 1-hexene, 4-methyl-1-pentene, preferably, 4-methyl-1-pentene or 1-hexene.

Commercially available L-LDPE are in the trade names: Unipol (U.C.C.), Dowlex (Dow Chemical Co., Ltd.), Sclair (Du - Pont de Namour Canada), Marlex (Phillips Co., Ltd.) and Ultzex (Mitsui Petroleum Chemical Industries Co., Ltd.). Among those polymers a most preferable polymer is a copolymer having a melt index (M. I.) of 0.4–15 and a density of 0.91–0.94 g/cm$^3$ containing 90–99.5 mol % ethylene 1-hexene or 4-methyl-1-pentene as α-olefin.

The polyethylene polymer layer used herein includes 50–100 % by weight of L-LDPE with the balance. Including mainly conventional polyethylene produced by the high pressure process and/or other polyolefin copolymer (for example, ethylene-vinyl acetate, propylene-ethylene, ethylene-acrylic acid, ethylene-ethylacrylate, ionomer, vinyl chloride-propylene etc.); and further including dispersing agent (hereinafter described), anti-oxidant, antistatic agent, lubricant, surface active agent, silicone oil and the like respectively in such an amount that the requisite properties of the polyethylene polymer layer are not adversely affected.

The polyethylene polymer layer contains substantially no light-shielding material and is adhered to at least one side of a substrate (or support or carrier) which may be of unilayer or multilayer to form a laminate. The term "contain substantially no light-shielding material" means that the light-shielding material is less than 1% by weight of the polyethylene polymer. At least any one layer other than the polyethylene polymer layer of the laminate contains the light-shielding material and the laminate as a whole contains sufficient light-shielding material to shield the light as a material for packaging light-sensitive materials. The light-shielding material may be a powdery or particulate material which shields the light and is dispersed in any of the layers of the laminate. The light-shielding material includes organic and inorganic pigments,, e.g., carbon black, titanium oxide, calcium carbonate, talc, clays, mica, zinc oxide, barium sulfate, cadmium pigments, chrome yellow pigments, red oxide, cobalt blue, copper phthalocyanine pigments, mono and polyazo pigments, aniline black and other various pigments; dyes; metallic powders such as aluminum powder; and the mixture thereof. A metal layer such as aluminum foil and deposited aluminum layer may be disposed in the laminate to provide complete light-shielding properties.

It is preferable that carbon black has an average particle size not larger than 50 mμ and its amount is not higher than 30% by weight, more preferably 1 to 20% by weight, most preferably 3 to 15% by weight in the case where carbon black, which is most generally used as the light-shielding material, is dispersed in any layer (for example substrate, adhesive layer or the like) other than the polyethylene polymer layer in the laminate. In the case where the amount of the incorporated carbon black is too low the shielding ability is not only low but also the static electricity effects have an influence. With too a high amount of the incorporated carbon black, the laminate film becomes brittle and loses the flexibility. The light-shielding material may be contained in the substrate layer or an adhesive layer, if desired. Alternatively known light-shielding layers such as an aluminum layer or printed light-shielding layers which are disclosed in Japanese Patent Kokai Publications No. 55-140835 and 52-150016, respectively, may be disposed on the substrate layer to provide the light-shielding properties.

Preferably, the thickness of the polyethylene polymer layer of the present invention amounts to 7 to 100 μm, more preferably 10 to 50 μm, from the point of view of the restriction of the total thickness of the light-shielding paper for photographic roll films and incident light through the edge portions. A layer having a thickness less than 7 μm is difficult to be coated. A layer exceeding 100 μm is too thick and unsuitable as a material for packaging light-sensitive materials, packaging bags and the light-shielding paper for photographic roll film.

Composite films may be produced by laminating the polyethylene polymer film with other packaging materials in conventional manners, e.g., thermal adhesion (including hot plate adhesion, impulse adhesion, or ultrasonic adhesion), manners using adhesives (including wet laminating, dry laminating, hotmelt laminating, extrusion laminating), coextrusion and the like. A composite packaging film having sufficient physical strength and tear readiness may be obtained by using an aluminum foil as said other packaging material. Paper is most preferable as substrate with respect to quality and cost, thus the preferred embodiments will be hereinafter disclosed with reference to the paper substrate. Kraft process pulp, sulfite pulp or a mixture thereof which give photographically no influence are preferred as paper for the substrate. Half-bleached or unbleached kraft paper, usual papers, recovered paper or a mixture thereof may be used, if an aluminum layer as disclosed in Japanese Patent Kokai Publication No. 55-140835 is used.

The substrate may be an uncolored or colored layer, or a laminate thereof. The substrate may contain light-shielding material such as carbon black, various pigments, various dyes, various metal powders; and additives such as antistatic agents, sizing agents, strengthening agents for paper or the like. The substrate may be subjected to various surface treatments, if desired.

The basis weight in substrate preferably ranges 20–120 g/m$^2$. The substrate is lacking of the physical properties in a range of the basis weight less. than 20 g/m$^2$, while the substrate has an excess rigidity and is rendered unsuitable as a light-shielding paper for photographic roll film if the basis weight exceeds 120 g/m$^2$. Paper serving as the substrate largely affects flexibility and physical strengths which are the typical requirements of the light-shielding paper for the photographic roll film. Addition of carbon black etc. will significantly deteriorate these properties. Accordingly, use of white paper as a substrate for the light-shielding paper will meet those requirements. The white paper has at least one white surface whereon printing may be present to enhance commerical image of the article to a great extent. On the other hand, use of the white paper entails a disadvantage that the paper has poor light-shielding ability. So far as white paper is used, the density of the light-shielding material added in a light-shielding layer and the thickness of the light-shielding layer should be increased in order to obtain a light-shielding ability equivalent to that of black colored paper.

The present invention provides a high quality material for packaging light-sensitive materials which meets all the following requirements, i.e., good processing properties for making bags or envelopes, heat seal properties, flexibility, strength, moisture proofness, antistatic properties and light-shielding properties.

Other and further objects, features, and advantages of the invention will appear more fully from the following description of embodiments with reference to the drawings. FIGS. 1–8 shows sectional views of the embodiments of the material for packaging light-sensitive materials according to the present invention.

The drawings and related disclosure do not limit the present invention thereto, and it should be understood that any modifications obvious in the art may be made without departing from the concept of the present invention.

As shown in FIGS. 2, 3, 4, 5, 6 and 8, light-shielding papers may be produced by laminating a substrate with a separately formed L-LDPE film having a light-shielding layer using adhesives, to form an adhesive layer, such as high pressure process polyethylene, rubber hot melt type adhesives, rubber solvent type adhesives.

Light-shielding papers for the photographic roll film of the present invention may permit various modes and embodiments. The typical structures thereof are shown in FIGS. 1 to 8. In the drawings, reference numeral 1 denotes a substrate; 1a a substrate containing light-shielding material (suffix "a" hereinafter denotes a layer containing light-shielding material), 2 a polyethylene polymer layer including not less than 50% by weight of L-LDPE (hereinafter referred to "L-LDPE film layer"). The L-LDPE film layer 2 may contain thermoplastic resins of various kinds, lubricants, antioxidizing agents, antistatic agents etc. Reference numeral 3 denotes an adhesive layer, 3a an adhesive layer containing light-shielding material or printed (ink) layer, 5 a protective layer, 6a an aluminum deposited layer, an aluminum foil, or a light-shielding layer such as light-shielding printed layer, 11 a transparent substrate and 11a a colored substrate.

FIG. 1 shows a light-shielding paper comprising a substrate 1a containing a light-shielding material, an L-LDPE film layer 2 coated upon one surface of the substrate 1a, and a protective layer 5 coated upon a reverse surface of the substrate 1a after printing 4 has been effected.

Figure 2:
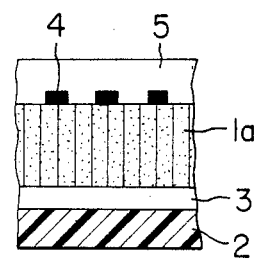

FIG. 2 shows a light-shielding paper produced by laminating a substrate 1a with an L-LDPE film layer 2 which has been independently formed by means of an adhesive layer 3.

Figure 3:
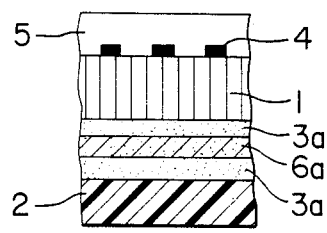

FIG. 3 shows an embodiment comprising a substrate 1, a light-shielding layer 6a applied on one surface of the substrate 1 by means of an adhesive layer 3a containing a light-shielding material, an L-LDPE film layer applied on the light-shielding layer 6a by means of an adhesive layer 3a containing light-shielding material, and a protective layer 5 coated upon the reverse printed surface of the substrate 1 with a printing 4.

Figure 4:
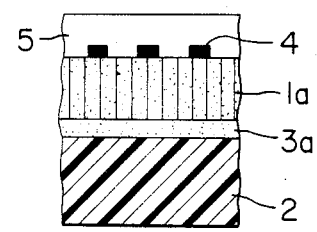

FIG. 4 shows an embodiment comprising a substrate 1a containing a light-shielding material, an L-LDPE film layer 2 applied upon the substrate 1a by means of an adhesive layer 3a containing a light-shielding material, and a protective layer 5 applied upon the other printed surface of the substrate 1a with a printing 4.

Figure 5:
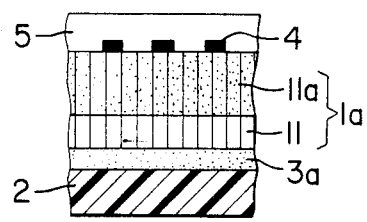

FIG. 5 shows an embodiment comprising a laminated substrate 1a composed of a transparent substrate 11 and a colored substrate 11a, a separately prepared L-LDPE film layer adhered by an adhesive layer 3a containing a light-shielding material, and a protective layer 5 coated upon the reverse printed surface of the substrate 1a with a printing 4.

Figure 6:
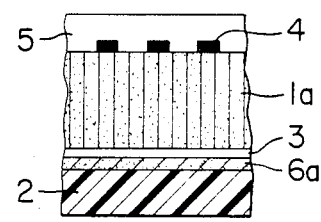

FIG. 6 shows an embodiment comprising a substrate 1a containing a light-shielding material, a separately prepared L-LDPE film layer 2 laminated with a light-shielding layer 6a of deposited aluminum coating or print coating by means of an adhesive layer 3, and a protective layer 5 applied upon the other surface of the printed substrate 1a with a printing 4.

Figure 7:
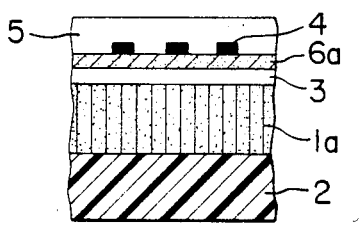

FIG. 7 shows an embodiment comprising a substrate 1a containing a light-shielding material, an L-LDPE film layer 2 coated upon one surface of the substrate 1a, a light-shielding layer 6a of an aluminum foil or colored film sheet etc. applied upon the other surface of the substrate 1a by means of an adhesive layer 3 and a protective layer 5 upon the printed surface of the light-shielding layer 6a with a printing 4.

Figure 8:
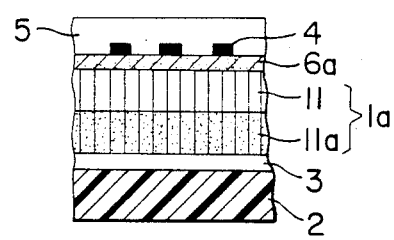

FIG. 8 shows an embodiment comprising a substrate 1a which is a laminate of a transparent substrate 11 and colored substrate 11a, a separately prepared L-LDPE film layer 2 applied upon one surface of the substrate 1a with an adhesive layer 3, a light-shielding layer 6a composed of a deposited aluminum coating or a light-shielding printed layer on the other surface of the substrate 1a, and a protective layer 5 on the protective layer 5 printed to form a printing 4. The protective layer 5 may be known ones encompassing, e.g., polymethyl methacrylate, polyethylene, polypropylene, or the like, and may be occasionally eliminated.

As hereinabove disclosed, the material for packaging light-sensitive materials, e.g., light-shielding papers according to the present invention comprises a combination of a substrate and at least one layer having a specific composition and permits various embodiments and modifications. In any case, the light-shielding papers disclosed as the embodiments of the present invention possess a moderate rigidity, strength and other excellent properties requisite for the packaging material for light-sensitive materials.

In the following examples of the light-shielding paper for the photographic roll film will be described.

Properties of the examples were evaluated as follows:

(1) Total thickness of the light-shielding paper:
measured by a micrometer in accordance with JIS-P8118-1976.

(2) Anti-static properties:
evaluated by measuring changes in electrostatic charge after predetermined processing, e.g., cutting a lightshielding paper or packaging.

(3) Light-shielding properties:
measured by detecting fog of an ASA 100 photographic film of exposure to light of 80,000 lx.

(4) Water vapor transmission ratio:
evaluated according to JIS-Z0208-1976 by measuring the weight of water content transmitted through a sample by using a moisture transmitting cup.

(5) Flexural rigidity:

evaluated from a bending moment obtained by a rigidity test of a paper board according to JIS-P8125-1976.

(6) Adhesion or stickiness between photographic film and light-shielding paper:

evaluated from the extent of the adhesion between an emulsion surface of the photographic film and a printed surface of the shielding-paper when unrolled after the film and the light-shielding paper have been superposedly wound together and left for few days at 50° C. and 80% humidity.

(7) Printing properties:

based on general view points evaluated from wear resistance and glossiness of the printed surface of a sample.

(8) Shrinkage or expansion:

evaluated by measuring changes in width of a light-shielding paper under various temperature- and humidity-conditions by a comparator.

(9) Maximum take-up torque (kg.mm):

light-shielding paper for photographic roll film and a photographic film are superposedly wound on a film spool. Maximum torque required for taking-up the film and the paper both loaded in a camera was measured by a torque meter.

(10) Tear strength (g):

measured in accordance with JIS-P-8116.

EXAMPLE 1

Tests were conducted to compare the properties of inventive and conventional light-shielding papers.

A light-shielding paper of the present invention having a structure as shown in FIG. 1 was used. As a substrate 1a a bleached kraft paper having a basis weight of 75 g/m² and a thickness of 83 μm, and containing 8% by weight of carbon black having light-shielding ability was used.

An L-LDPE resin layer 2 was coated by hot-melt-extrusion upon the bleached kraft paper 1a resulting in a layer thickness of 20 μm. After the substrate 1a had been coated with a print ink 4 the other side, the substrate 1a was applied with a protective layer 5 of polymethacrylate having a thickness of 2 μm. The resultant light-shielding paper sample had a thickness of 105 μm. On the other hand, a conventional light-shielding paper was used for a reference sample. The reference paper was structurally similar with the inventive papers except that a high pressure process polyethylene layer (LDPE) was coated by a hot melt extrusion process with a thickness of 20 μm. Strips of light-shielding papers for photographic roll film prepared from each samples were superposedly wound together with a photographic film on a polystyrene spool. The resultant two sheets of light-shielding papers were evaluated by the aforementioned manners to compare properties. The results are shown in Table 1. In Table 1, reference symbol A, B, C or D respectively denotes excellent; practically applicable; slightly problematic; or improvement required (the same applies for all the Tables hereinafter). The results shows that the inventive light-shielding paper has excellent properties such as flexural rigidity, maximum take-up torque, tear strength superior than those of the conventional light-shielding paper.

TABLE 1

|  | Present invention (Ex. 1) | Reference sample (1) |
| --- | --- | --- |
| Material of resin layer 2 | L-LDPE | LDPE |
| Total thickness | 105 μm | 105 μm |
| Light-shielding ability | B | B |
| Flexural rigidity | A 1.95 g · cm | B 2.35 g · cm |
| Maximum take-up torque | A 3.1 Kg · mm | B 4.5 Kg · mm |
| Tear strength | A | B |

EXAMPLE 2

A light-shielding paper having a structure as shown in FIG. 4 was prepared. A bleached kraft paper 1a contains 9% by weight of carbon black to yield light-shielding, the paper 1a having a basis weight of 60 g/m² and a thickness of 70 μm. A separately prepared L-LDPE film 2 having a thickness of 20 μm was applied to the paper 1a by means of an LDPE adhesive layer 3a having a thickness of 13 μm and a carbon black density of 4% by weight, the adhesive layer 3a having been formed through hot melt extrusion coating.

The kraft paper 1a was printed with an ink 4 on its other surface then coated with polymethyl methacrylate to form a 2 μm thickness film. The resultant sample had a total thickness of 105 μm.

A reference structurally identical with the inventive sample except that LDPE film is used in lieu of L-LDPE film was prepared. Light-shielding papers for a photographic roll film prepared from each samples were superposedly wound together on a polystyrene spool. The properties of both samples were compared each other as shown in Table 2. This revealed that the inventive light-shielding paper has excellent properties.

TABLE 2

|  | Present invention (Ex. 2) | Reference sample (2) |
| --- | --- | --- |
| Material of resin layer 2 | LDPE + L-LDPE | LDPE |
| Total thickness | 105 μm | 105 μm |
| Light-shielding ability | B | B |
| Flexural rigidity | A 1.85 g · cm | B 2.25 g · cm |
| Maximum take-up torque | A 2.9 Kg · mm | B 4.0 Kg · mm |
| Tear strength | A | B |

EXAMPLE 3

A light-shielding paper having a structure as shown in FIG. 3 was prepared. A substrate made of white kraft paper has a basis weight of 30 g/cm² and a thickness of 35 μm. The substrate and an aluminum foil 6a having a thickness of 9 μm were laminated with a hot melt extrusion coated adhesive layer 3a of L-LDPE having a thickness of 15 μm and containing 4% by weight of carbon black. On a free surface of the aluminum foil 6a L-LDPE film layer 2 of a 20 μm thickness was laminated with a hot-melt-extrusion-coated adhesive layer 3a having a thickness of 15 μm and containing 4% by weight of carbon black. After printing of ink 4 on the other free surface of the substrate 1, a protective layer 5 was applied on the printed surface resulting in a light-shielding paper.of a total thickness of 105 μm.

A reference sample, i.e., a conventional light-shielding paper (105 μm thick) which is identical with the inventive sample of this Example 3 except that an hot melt extruded LDPE coating layer having a thickness of 10 μm and an LDPE layer of a 20 μm thickness were applied in lieu of L-LDPE respectively for the protective layer 5 and the L-LDPE film layer 2.

Light-shielding papers for photographic roll film were prepared from those samples and superposedly wound on a polystyrene spool. The properties of the light-shielding papers were compared resulting in Table 3, which shows that the inventive light-shielding papers have more excellent properties.

TABLE 3

|  | Present invention (Ex. 3) | Reference (3) | Reference (2) | Reference (1) |
|---|---|---|---|---|
| Material of resin layer 2 | Separately formed film L-LDPE | Separately formed film LDPE | LDPE | LDPE |
| Total thickness | 105 μm | 105 μm | 105 μm | 105 μm |
| Light-shielding ability | A | A | B | B |
| Flexural rigidity | A 2.1 g · cm | C 4.3 g · cm | B 2.25 g · cm | B 2.35 g · cm |
| Maximum take-up torque | A 3.2 kg · mm | C 6.5 kg · mm | B 4.0 Kg · mm | B 4.5 Kg · mm |
| Tear strength | A | B | B | B |
| Moisture proofness | A | A | B | B |
| Shrinkage or extension | A | A | B | B |
| Printing properties | A | A | B | B |
| Antistatic properties | A | A | B | C |

In Table 3, properties other than those as shown in Table 1 and Table 2 are shown with respect to the reference samples for Examples 1 and 2, as well.

EXAMPLE 4

A light-shielding paper having a structure as shown in FIG. 6 was prepared. A substrate 1a was composed of bleached kraft paper having a basis weight of 40 g/m² a thickness of 50 μm, and containing 9% by weight of carbon black. A blended L-LDPE film 2 having a thickness of 40 μm was beforehand formed of a blend of 10% by weight of LDPE and 90% by weight of L-LDPE. An aluminum layer of 800 Å thick was deposited on the blended L-LDPE film, the resultant complex film was laminated with the substrate 1a by an LDPE adhesive layer 3 of hot melt extrusion coating having a thickness of 13 μm. On the other free surface of the substrate 1a, an ink 4 was printed then polymethyl methacrylate was coated thereon to form a protective layer 5 of a 2 μm thickness. The total thickness of the light-shielding paper sample was 105 μm.

A reference sample was prepared, i.e., a conventional light-shielding paper having an identical layer structure with the inventive sample of Example 4 except that an LDPE film layer was used in lieu of the film layer of the blended film of LDPE and L-LDPE. Light-shielding papers for photographic roll film were made from each samples and superposedly wound together on a polystyrene spool.

Comparison of various properties shown in Table 4 was made in the same manners as aforementioned. The result shows that all the properties of Example 4 are superior to the conventional reference samples.

Tests of other two reference samples for Ex. 3 and Ex. 2 were also made with different total thickness and incorporation of carbon black in the substrate, otherwise in the same manners as the reference samples for Ex. 3 and Ex. 2, respectively, and the results are shown in Table 4.

Accordingly, it is apparent from the foregoing disclosure that the following effects have been achieved by the light-shielding paper for photographic roll film according to the present invention.

(1) Properties on loading into a camera and good due to the low flexural rigidity and good flexibility accompanied by less sagging.

(2) The maximum take-up torque is low.

(3) Tear strength is high.

Thus papers having favorable properties required for the light-shielding paper for photographic roll film may be obtained. Those properties are also advantageous for a packaging material and a packaging bag for various materials whose quality and value would deteriorate on exposure to light.

The light-sensitive materials encompass photosensitive materials such as silver halide (photographic) photosensitive materials, diazo photosensitive materials, photosensitive resins, (photographic) photosensitive materials of the self-developing type, diffusion transfer photosensitive materials, and all the other materials which may change the colors, cure or deteriorate on exposure to light.

TABLE 4

|  | Present invention (Ex. 4) | Reference (4) | Reference (3) | Reference (2) |
|---|---|---|---|---|
| Material of resin layer | Separately formed film L-LDPE + LDPE | Separately formed film LDPE | Separately formed film LDPE + carbon black | LDPE + carbon black |
| Total thickness | 105 μm | 105 μm | 98 μm | 97 μm |
| Light-shielding ability | A | A | A | A |
| Flexural rigidity | A 2.0 g · cm | C 4.0 g · cm | C 4.3 g · cm | B 2.25 g · cm |

TABLE 4-continued

| | Present invention (Ex. 4) | Reference (4) | Reference (3) | Reference (2) |
|---|---|---|---|---|
| Maximum take-up torque | A 3.1 Kg · mm | C 6.0 Kg · mm | C 6.5 Kg · mm | B 4.0 Kg · mm |
| Tear strength | A | A | B | B |
| Moisture proofness | A | A | A | B |
| Shrinkage or extension | A | A | A | B |
| Antistatic properties | A | A | A | B |

Specifically, such light-sensitive materials encompass foods such as chocolate, margarine, fermentation products such as Miso, wine, beer and the like, pharmaceutical articles, dyes and other chemical materials such as developing solution and mordants for dye and the like.

The substrate includes paper, colored paper, synthetic paper, cellophane, bonded fabric, foamed sheet of polyethylene, polystyrene, polyurethane etc., paper board, K-liner, various thermoplastic resin films, triacetate film, diacetate film, polyvinyl alcohol film, cross laminated airly fabric, aluminum foil, metal-deposited films, metal-deposited papers and the like. Those substrates may be used either solely or in combination thereof.

Adhesives encompass extrusion laminate type adhesives consisting of therm oplastic resins such as various polyethylene, ethylene-ethyl acrylate copolymer, ethylene-vinyl acetate copolymer, L-LDPE, polypropylene, ionomer or the like; water soluble adhesion; solvent type adhesives, hot melt type adhesives or the like.

It should be construed that any modifications obvious in the art would be made without departing from the inventive concept and the scope as claimed.

I claim:

1. A material for packaging light-sensitive materials consisting of a laminate comprising a substrate, a polyethylene polymer layer which is non-adhesive under ambient conditions and which is directly or indirectly attached to the substrate comprising not less than 50% by weight of linear low density polyethylene (L-LDPE) which is a copolymer of ethylene and an α-olefin of 3 to 13 carbon atoms on a linear chain, and containing substantially no light-shielding material, said laminate further comprising light-shielding material outside of said polyethylene polymer layer in an amount sufficient to provide light-shielding properties to the laminate.

2. A material as defined in claim 1, wherein the L-LDPE comprises 80 to 99.5 mol % ethylene.

3. A material as defined in claim 1, wherein the α-olefin has 4 to 10 carbon atoms.

4. A material as defined in claim 1, wherein the α-olefin is one selected from the group consisting of 1-butene, 1-octene, 1-hexene, 4-methyl-1-pentene and a mixture thereof.

5. A material as defined in claim 1, wherein the α-olefin is 4-methyl-1-pentene, 1-hexene or a mixture thereof.

6. A material as defined in claim 2, wherein the L-LDPE comprises 90 to 99.5 mol % ethylene.

7. A material as defined in claim 1, wherein the L-LDPE has a melt index (M.I. at 190° C.) of 0.2 to 25.

8. A material as defined in claim 7, wherein the L-LDPE has a M.I. of 0.4 to 15.

9. A material as defined in claim 1, wherein the L-LDPE has a density of 0.91 to 0.95 g/cm$^3$.

10. A material as defined in claim 2, wherein said polyethylene polymer layer substantially consists of polyethylene polymer.

11. A material as defined in claim 10, wherein said polyethylene polymer of said polyethylene polymer layer essentially consists of 50–100% by weight of L-LDPE with the balance being selected from the group consisting of high pressure process polyethylene (LDPE), other polyolefin copolymer or a mixture thereof.

12. A material as defined in claim 11, wherein said other polyolefin copolymer is one selected from the group consisting of ethylene-vinyl acetate, propylene-ethylene, ethylene-acrylic acid, ethylene-ethylacrylate, ionomer, vinyl chloride-propylene and a mixture thereof.

13. A material as defined in claim 1, wherein said polyethylene polymer layer comprises less than 1% by weight of light-shielding material based on the polyethylene polymer.

14. A material as defined in claim 1, wherein said polyethylene polymer layer comprises no light-shielding material.

15. A material as defined in claim 1, wherein light-shielding material is one or more selected from the group consisting of particulated material, metallic foil, deposited metal film or a combination thereof.

16. A material as defined in claim 15, wherein the light-shielding material is carbon black, aluminum foil, deposited aluminum film or a combination thereof.

17. A material as defined in claim 1, wherein the substrate is a flexible sheet.

18. A material as defined in claim 17, wherein flexible sheet is paper.

19. A material as defined in claim 1, wherein the laminate further comprises an outer protective layer.

20. A material as defined in claim 19, wherein the protective layer is provided on a side of the laminate opposite to the polyethylene polymer layer.

21. A material as defined in claim 1, wherein the polyethylene polymer layer forms at least one surface of the laminate.

22. A material as defined in claim 1, wherein the laminate comprises a substrate, a polyethylene polymer on one side of the substrate and a protective layer on the other side of the substrate.

23. A material as defined in claim 1, wherein the laminate comprises a substrate containing carbon black, a polyethylene polymer layer on a side of the substrate, an adhesive layer therebetween, and a protective layer on the other side of the substrate.

24. A material as defined in claim 1, wherein the laminate comprises a substrate, an adhesive layer on one side of the substrate an aluminum foil on the adhesive layer, a second adhesive layer on the aluminum foil, a polyethylene polymer layer on the second adhesive layer, and a protective layer on the other side of the substrate.

25. A material as defined in claim 1, wherein the laminate comprises a substrate containing light-shielding material. an adhesive layer on one side of the substrate, a deposited aluminum layer on the adhesive layer, a polyethylene polymer layer on the aluminum layer, and a protective layer on the other side of the substrate.

26. A material as defined in claim 1, wherein the laminate comprises a substrate, a polyethylene polymer layer on one side thereof, an adhesive layer on the other side of the substrate, an aluminum layer on the adhesive layer, and a protective layer on the aluminum layer.

27. A material as defined in any of claims 23-26, wherein said adhesive layer is LDPE, L-LDPE or a blend thereof.

28. A material as defined in any of claims 23-26, wherein the substrate is paper.

29. A material as defined in any of claims 22-26 wherein the light-shielding material comprises carbon black.

30. A material as defined in claim 1, wherein said polyethylene polymer layer is a surface layer of the laminate.

* * * * *